(12) United States Patent
Matsubara et al.

(10) Patent No.: US 8,099,626 B2
(45) Date of Patent: Jan. 17, 2012

(54) RECOVERY METHOD MANAGEMENT DEVICE, RECOVERY METHOD MANAGEMENT METHOD AND COMPUTER PRODUCT FOR RECOVERING A FAILURE OF IT SYSTEM

(75) Inventors: Masazumi Matsubara, Kawasaki (JP); Yasuhide Matsumoto, Kawasaki (JP); Yukihiro Watanabe, Kawasaki (JP); Kuniaki Shimada, Kawasaki (JP); Yuji Wada, Kawasaki (JP); Kenji Morimoto, Bunkyo (JP); Hiroshi Otsuka, Kawasaki (JP); Akira Katsuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/955,264

(22) Filed: Nov. 29, 2010

(65) Prior Publication Data

US 2011/0072305 A1 Mar. 24, 2011

Related U.S. Application Data

(63) Continuation of application No. PCT/JP2008/060070, filed on May 30, 2008.

(51) Int. Cl.
*G06F 11/00* (2006.01)
(52) U.S. Cl. .......................... 714/15; 714/21
(58) Field of Classification Search .................. None
See application file for complete search history.

(56) References Cited

U.S. PATENT DOCUMENTS

| | | | | |
|---|---|---|---|---|
| 6,151,683 A * | 11/2000 | Wookey | ............................ | 714/2 |
| 6,385,707 B1 * | 5/2002 | Maffezzoni | ................... | 711/162 |
| 7,801,699 B1 * | 9/2010 | Roucis et al. | ................. | 702/182 |
| 2001/0000812 A1 * | 5/2001 | Waldo et al. | ................... | 709/225 |
| 2005/0015665 A1 * | 1/2005 | Kato et al. | ....................... | 714/15 |
| 2005/0283638 A1 | 12/2005 | Kato | | |
| 2007/0168720 A1 * | 7/2007 | Chatterjee et al. | .............. | 714/15 |
| 2008/0059967 A1 * | 3/2008 | Matsui et al. | ................. | 718/102 |
| 2008/0141261 A1 * | 6/2008 | Machida | ...................... | 718/104 |
| 2008/0184244 A1 * | 7/2008 | Shankar et al. | ............... | 718/102 |

FOREIGN PATENT DOCUMENTS

| | | |
|---|---|---|
| JP | 06-103047 | 4/1994 |
| JP | 08-314751 | 11/1996 |
| JP | 10-069400 | 3/1998 |
| JP | 2005-018103 | 1/2005 |
| JP | 2005-122383 | 5/2005 |
| JP | 2005-346331 | 12/2005 |
| JP | 2008-090504 | 4/2008 |

* cited by examiner

*Primary Examiner* — Christopher McCarthy
(74) *Attorney, Agent, or Firm* — Fujitsu Patent Center

(57) ABSTRACT

A recovery method management method includes executing and completing a work on a work target of a system according to a work start command and a work completion command, creating working method information for each work target, acquiring before-work-start system information and after-work-completion system information of the system to create before-and-after-work change information for each work target, storing and managing the working method information and the before-and-after-work change information in a work information managing and storing unit for each work target, creating recovery method information for each similar recovery work target among the work targets on the basis of the working method information, creating before-and-after-recovery change information for each recovery work target on the basis of the before-and-after-work change information, and storing and managing the recovery method information created and the before-and-after-recovery change information created in a recovery method managing and storing unit for each recovery work target.

9 Claims, 8 Drawing Sheets

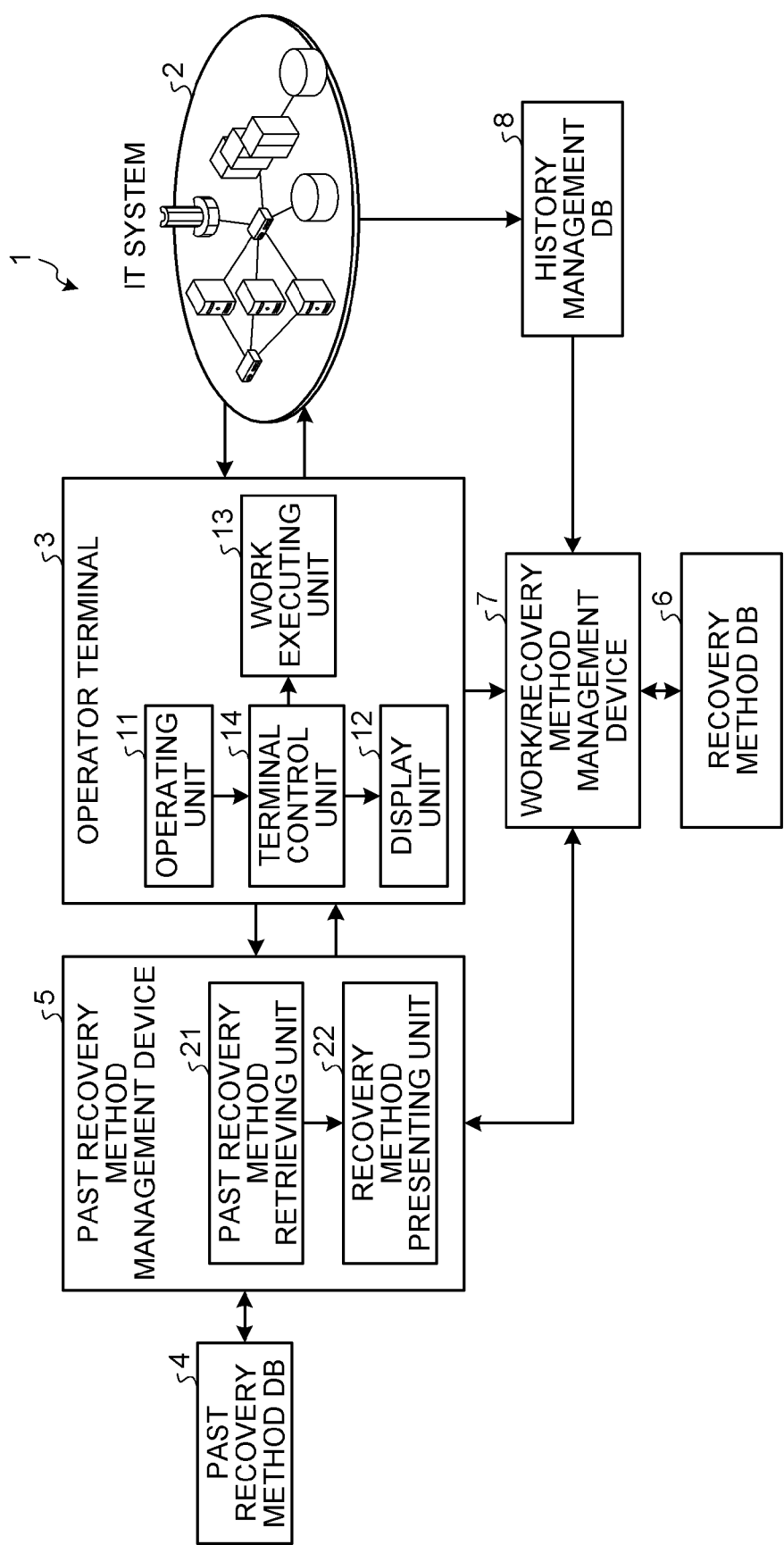

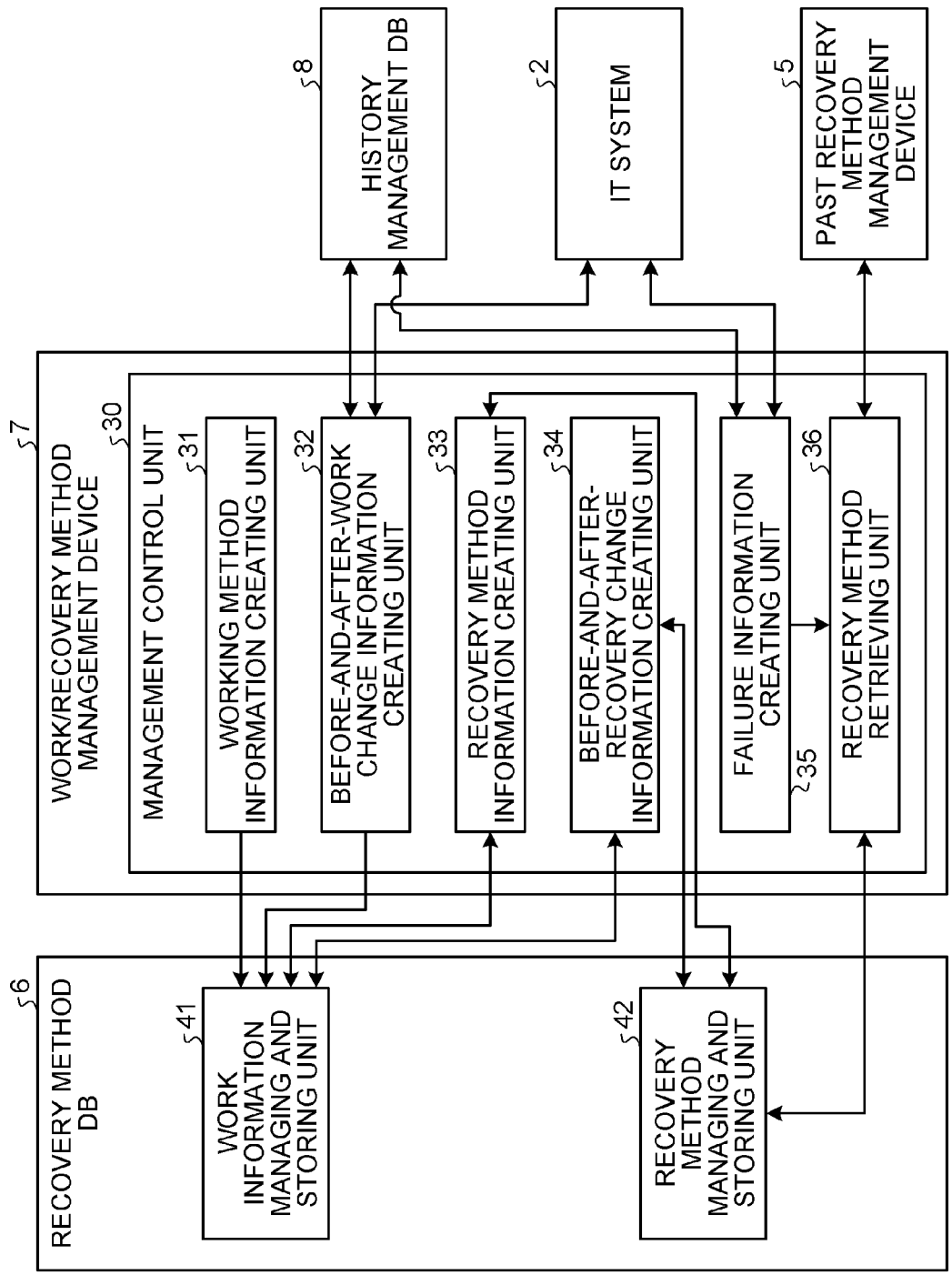

| WORKING METHOD INFORMATION | WORK TARGET | BEFORE-AND-AFTER-WORK CHANGE INFORMATION |
|---|---|---|
| EXECUTION OF SHUTDOWN COMMAND ON SERVER 1 | STATE OF SERVER 1 | ON -> OFF |
| | STATE OF SERVICE A | RUNNING -> STOP |
| EXECUTION OF START PROCESS ON SERVER 1 | STATE OF SERVER 1 | OFF -> ON |
| EXECUTION OF "SERVICE STOP SERVICE A" | STATE OF SERVICE A | RUNNING -> STOP |
| EXECUTION OF SHUTDOWN COMMAND ON SERVER 2 | STATE OF SERVER 2 | ON -> OFF |
| MEMORY EXCHANGE OF SERVER 1 | MEMORY STATE OF SERVER 1 | ERROR -> NORMAL |
| CHANGE VALUE OF PARAMETER MaxThreads OF APPLICATION 1 TO 20->30 | PARAMETER MaxThreads OF APPLICATION 1 | 20 -> 30 |
| | AVERAGE RESPONSE TIME OF APPLICATION 1 | 3000 msec -> 50 msec |
| ... | ... | ... |

AGGREGATION

42

| RECOVERY WORK TARGET | BEFORE-AND-AFTER-RECOVERY CHANGE INFORMATION | RECOVERY METHOD INFORMATION |
|---|---|---|
| STATE OF SERVER | ON -> OFF | EXECUTION OF SHUTDOWN COMMAND |
| | OFF -> ON | EXECUTION OF SERVER START PROCESS |
| STATE OF SERVICE | RUNNING -> STOP | EXECUTION OF "SERVICE STOP" COMMAND |
| STATE OF MEMORY | ERROR -> NORMAL | MEMORY PART EXCHANGE |
| AVERAGE RESPONSE TIME OF APPLICATION | DECREASE | INCREASE VALUE OF PARAMETER MaxThreads |
| | INCREASE | DECREASE VALUE OF PARAMETER MaxThreads |
| ... | ... | ... |

FIG.4

BEFORE-FAILURE-OCCURRENCE SYSTEM INFORMATION

| ITEM TYPE | | PARAMETER | VALUE |
|---|---|---|---|
| SERVER | | ID | SERVER 1 |
| | | NICKNAME | svr1 |
| | | SERIAL NUMBER | XXX0123 |
| | | PLATFORM | Linux |
| | | STATUS | normal |
| | CPU | ID | CPU1-1 |
| | | CLOCK FREQUENCY | 3.0GHz |
| | | STATUS | normal |
| | CPU | ID | CPU1-2 |
| | | CLOCK FREQUENCY | 3.0GHz |
| | | STATUS | normal |
| | MEMORY | ID | mem1-1 |
| | | CAPACITY | 4GB |
| | | STATUS | normal |
| SERVER | | ID | SERVER 2 |
| | | NICKNAME | svr2 |
| | | SERIAL NUMBER | XXX0130 |
| | | PLATFORM | Linux |
| | | STATUS | normal |
| | CPU | ID | CPU2-1 |
| | | CLOCK FREQUENCY | 1.5GHz |
| | | STATUS | normal |
| | CPU | ID | CPU2-2 |
| | | CLOCK FREQUENCY | 1.5GHz |
| | | STATUS | normal |
| | MEMORY | ID | mem1-1 |
| | | CAPACITY | 2GB |
| | | STATUS | normal |
| APPLICATION | | ID | APPLICATION 1 |
| | | TYPE | PAYROLL CALCULATION |
| | | NUMBER OF THREADS | 10 |
| | | AVERAGE RESPONSE TIME | 50msec |
| | | STATUS | NORMAL |

COMPARISON

AFTER-FAILURE-OCCURRENCE SYSTEM INFORMATION

| ITEM TYPE | | PARAMETER | VALUE |
|---|---|---|---|
| SERVER | | ID | SERVER 1 |
| | | NICKNAME | svr1 |
| | | SERIAL NUMBER | XXX0123 |
| | | PLATFORM | Linux |
| | | STATUS | normal |
| | CPU | ID | CPU1-1 |
| | | CLOCK FREQUENCY | 3.0GHz |
| | | STATUS | normal |
| | CPU | ID | CPU1-2 |
| | | CLOCK FREQUENCY | 3.0GHz |
| | | STATUS | error |
| | MEMORY | ID | mem1-1 |
| | | CAPACITY | 4GB |
| | | STATUS | normal |
| SERVER | | ID | SERVER 2 |
| | | NICKNAME | svr2 |
| | | SERIAL NUMBER | XXX0130 |
| | | PLATFORM | Linux |
| | | STATUS | normal |
| | CPU | ID | CPU2-1 |
| | | CLOCK FREQUENCY | 1.5GHz |
| | | STATUS | normal |
| | CPU | ID | CPU2-2 |
| | | CLOCK FREQUENCY | 1.5GHz |
| | | STATUS | normal |
| | MEMORY | ID | mem1-1 |
| | | CAPACITY | 2GB |
| | | STATUS | normal |
| APPLICATION | | ID | APPLICATION 1 |
| | | TYPE | PAYROLL CALCULATION |
| | | NUMBER OF THREADS | 10 |
| | | AVERAGE RESPONSE TIME | 3000msec |
| | | STATUS | NORMAL |

RECOVERY METHOD MANAGEMENT DEVICE, RECOVERY METHOD MANAGEMENT METHOD AND COMPUTER PRODUCT FOR RECOVERING A FAILURE OF IT SYSTEM

CROSS-REFERENCE TO RELATED APPLICATION(S)

This application is a continuation of International Application No. PCT/JP2008/060070, filed on May 30, 2008, the entire contents of which are incorporated herein by reference.

FIELD

The embodiments discussed herein are directed to a recovery method management device and a recovery method management method that make it possible to present a recovery method for recovering an IT system including a plurality of servers from a failure of the IT system to an operator side.

BACKGROUND

Conventionally, when a failure occurs in an IT system including a plurality of servers and the like and an operator does not know a recovery method for recovering the IT system from the failure, a recovery work is performed in accordance with the determination of the operator on the basis of a recovery method procedure manual.

However, a work for selecting an appropriate recovery method from an enormous amount of information of the recovery method procedure manual largely depends on an operator's own skill and thus causes a large burden on the operator.

Therefore, there has been recently known the following recovery method management system designed to reduce the burden of the operator when selecting a recovery method.

FIG. 8 is a block diagram illustrating the internal schematic configuration of a conventional recovery method management system 100.

The recovery method management system 100 illustrated in FIG. 8 includes an IT system 101 that includes a plurality of servers and the like, an operator terminal 102 that monitors a failure of the IT system 101, a past recovery method database (hereinafter, "DB") 103 that stores and manages a recovery method for a past failure, and a past recovery method management device 104 that manages the past recovery method DB 103.

The operator terminal 102 includes an operating unit 111 that inputs information such as various commands, a display unit 112 that displays various information, a work executing unit 113 that executes, for example, a recovery work for recovering a failure of the IT system 101 in response to the command input by the operating unit 111, and a terminal control unit 114 that controls the operator terminal 102.

The past recovery method management device 104 includes a past recovery method retrieving unit 121 and a recovery method presenting unit 122. The past recovery method retrieving unit 121 retrieves, when receiving the failure state output from the operator terminal 102, a past recovery method corresponding to the failure state from the past recovery method DB 103. The recovery method presenting unit 122 informs the operator terminal 102 of the past recovery method corresponding to the failure state that is retrieved by the past recovery method retrieving unit 121.

When acquiring the past recovery method corresponding to the failure state via the recovery method presenting unit 122, the operator terminal 102 displays the past recovery method on the display unit 112.

As a result, the operator terminal 102 can execute a failure recovery work on the basis of the past recovery method corresponding to the failure state that is displayed on the display unit 112.

In the conventional recovery method management system 100, when the IT system 101 has a failure, the operator terminal 102 informs the past recovery method management device 104 of a failure state, and the past recovery method management device 104 retrieves a past recovery method in accordance with the failure state and presents the retrieved past recovery method to the operator terminal 102. Therefore, an operator can easily acquire the recovery method for the past failure state that is stored in the past recovery method DB 103 even if the operator does not know the recovery method for the failure. Thus, the burden of the operator side can be largely reduced. For a further description of the conventional technology, see Japanese Laid-open Patent Publication No. 06-103047 and Japanese Laid-open Patent Publication No. 2008-90504, for example.

However, the conventional recovery method management system 100 largely depends on a memory content of the past recovery method DB 103. Therefore, because an operator should determine a recovery method for an unknown failure state that is not stored in the past recovery method DB 103, the operator has a burden.

SUMMARY

According to an aspect of an embodiment of the invention, a computer-readable, non-transitory medium stores therein a recovery method management program. The recovery method management program causes a computer to execute a process comprising executing a work on a work target of a system when detecting a work start command and completing the executing work on the work target when detecting a work completion command, creating working method information that indicates a working method for each work target executed in the executing, acquiring before-work-start system information of the system when detecting the work start command and acquiring after-work-completion system information when detecting the work completion command to create before-and-after-work change information related to a change of the system before and after the work for each work target on the basis of difference information between the acquired before-work-start system information and after-work-completion system information, storing and managing the working method information created in the creating and the before-and-after-work change information created in the acquiring in a work information managing and storing unit for each work target, creating recovery method information that indicates a recovery method for each similar recovery work target among the work targets on the basis of the working method information stored in the work information managing and storing unit, creating before-and-after-recovery change information related to a change of the system before and after a recovery work for each recovery work target on the basis of the before-and-after-work change information stored in the work information managing and storing unit, and storing and managing the recovery method information created in the creating and the before-and-after-recovery change information created in the creating in a recovery method managing and storing unit for each recovery work target.

According to another aspect of an embodiment of the invention, a recovery method management device includes a work executing unit that executes a work on a work target of a system when detecting a work start command and completes the executing work on the work target when detecting a work completion command, a working method information creating unit that creates working method information indicating a working method for each work target executed by the work executing unit, a before-and-after-work change information creating unit that acquires before-work-start system information of the system when detecting the work start command and acquires after-work-completion system information when detecting the work completion command to create before-and-after-work change information related to a change of the system before and after the work for each work target on the basis of difference information between the acquired before-work-start system information and after-work-completion system information, a work information managing and storing unit that stores and manages the working method information created by the working method information creating unit and the before-and-after-work change information created by the before-and-after-work change information creating unit for each work target, a recovery method information creating unit that creates recovery method information indicating a recovery method for each similar recovery work target among the work targets on the basis of the working method information stored in the work information managing and storing unit, a before-and-after-recovery change information creating unit that creates before-and-after-recovery change information related to a change of the system before and after a recovery work for each recovery work target on the basis of the before-and-after-work change information stored in the work information managing and storing unit, and a recovery method managing and storing unit that stores and manages the recovery method information created by the recovery method information creating unit and the before-and-after-recovery change information created by the before-and-after-recovery change information creating unit for each recovery work target.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a block diagram illustrating the internal schematic configuration of a recovery method management system that is an embodiment of a recovery method management device of the present invention;

FIG. 2 is a block diagram illustrating the internal schematic configuration of a work/recovery method management device and a recovery method DB that are main parts of the present embodiment;

FIG. 3 is an explanation diagram plainly illustrating the memory content of a work information managing and storing unit and a recovery method managing and storing unit of the recovery method DB;

FIG. 4 is an explanation diagram plainly illustrating a relationship between before-failure-occurrence system information and after-failure-occurrence system information;

DESCRIPTION OF EMBODIMENT(S)

Figure 5:
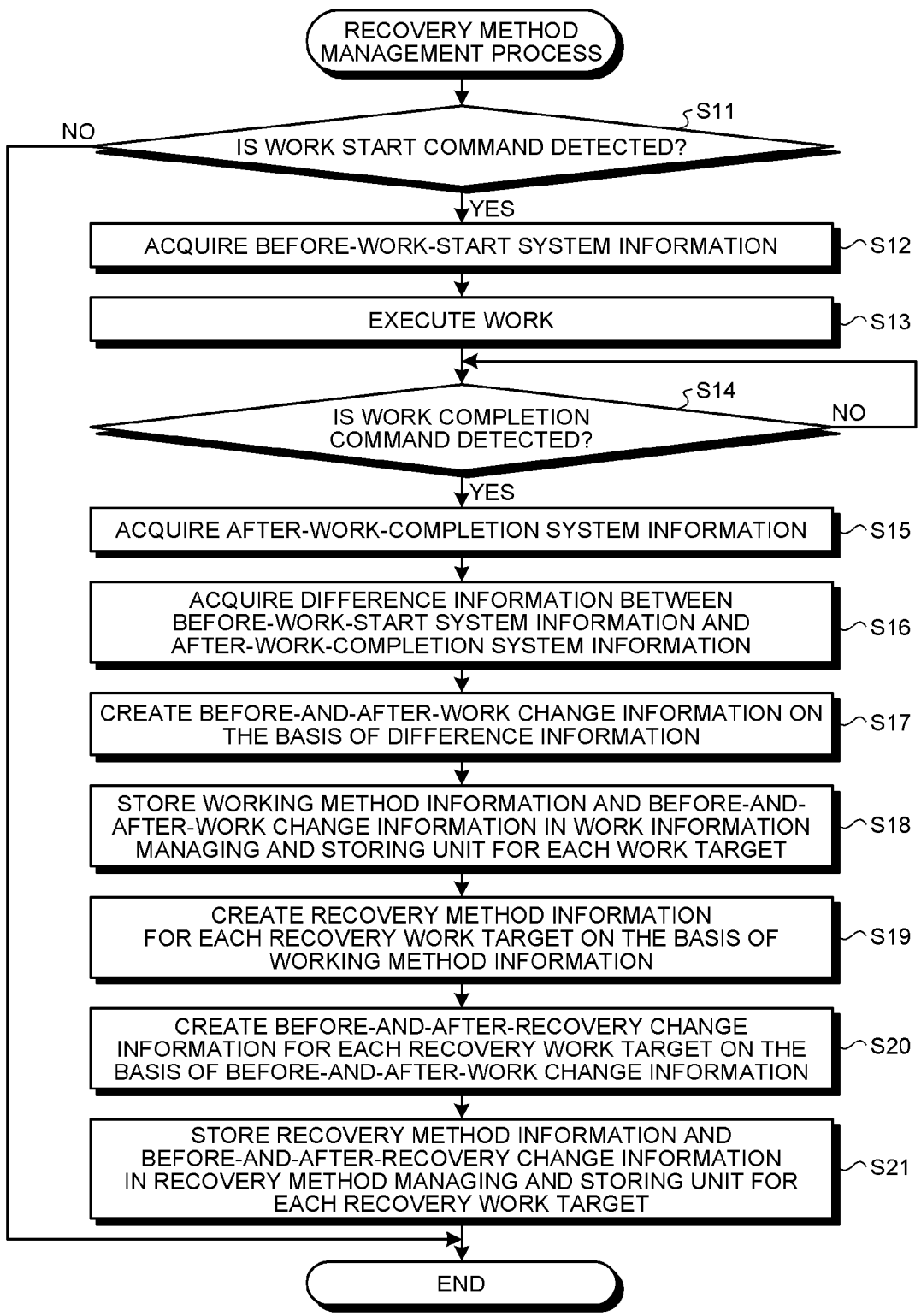
FIG. 5 is a flowchart illustrating the process operation of the recovery method management system that is related to a recovery method management process.

Preferred embodiments of the present invention will be explained with reference to accompanying drawings.

First, it will be explained about the brief description of the present embodiment. In the present embodiment, before-and-after-work change information created for each work target and working method information indicating a working method created for each work target on the basis of difference information between before-work-start system information and after-work-completion system information are stored in a work information managing and storing unit, and thus an influence of each work that is given to a system can be constantly grasped in advance.

Furthermore, in the present embodiment, before-and-after-recovery change information related to a system change before and after a recovery work for each similar recovery work target and recovery method information indicative of a recovery method for each recovery work target among the work targets are stored in a recovery method managing and storing unit on the basis of the working method information and the before-and-after-work change information stored in the work information managing and storing unit.

As a result, because a recovery method (recovery method information) for an unknown failure can be selected on the basis of a recovery work target and before-and-after-recovery change information corresponding to the failure by using the memory content of the recovery method managing and storing unit even if the unknown failure occurs, the burden of an operator can be reduced.

Embodiment

FIG. 1 is a block diagram illustrating the internal schematic configuration of a recovery method management system 1 according to the present embodiment.

The recovery method management system 1 illustrated in FIG. 1 includes an IT system 2 that includes a plurality of servers and the like, an operator terminal 3 that monitors a failure of the IT system 2, a past recovery method DB 4 that stores and manages a recovery method for a past failure, and a past recovery method management device 5 that manages the past recovery method DB 4.

The operator terminal 3 includes an operating unit 11 that inputs information such as various commands, a display unit 12 that displays various information, a work executing unit 13 that executes, for example, a recovery work for the failure of the IT system 2 in response to the command input by the operating unit 11, and a terminal control unit 14 that controls the operator terminal 3.

The past recovery method management device 5 includes a past recovery method retrieving unit 21 and a recovery method presenting unit 22. The past recovery method retrieving unit 21 retrieves, when receiving a failure state detected by the operator terminal 3, a past recovery method corresponding to the failure state from the past recovery method DB 4. The recovery method presenting unit 22 informs the operator terminal 3 of the past recovery method corresponding to the failure state that is retrieved by the past recovery method retrieving unit 21.

When acquiring the past recovery method corresponding to the failure state via the recovery method presenting unit 22, the operator terminal 3 displays the past recovery method on the display unit 12.

As a result, the operator terminal 3 executes a recovery work on the basis of the past recovery method corresponding to the failure state that is displayed on the display unit 12.

Moreover, the work executing unit 13 of the operator terminal 3 executes a work on a work target of the IT system 2 when detecting a work start command from the operating unit 11 and completes the executing work on the work target when detecting a work completion command from the operating unit 11.

Furthermore, the recovery method management system 1 includes a recovery method DB 6 that stores and manages a recovery method for an unknown failure, a work/recovery method management device 7 that manages the recovery method DB 6, and a history management DB 8 that sequentially and historically stores the internal system information of the IT system 2 for each predetermined timing.

In this case, the internal system information includes configuration information, performance information, status information, and the like of the IT system 2. The configuration information corresponds to information related to the configuration of a server, a CPU, a memory, an application, and the like of the IT system 2 as illustrated in FIG. 4. The performance information corresponds to information related to the performance such as a clock frequency of a CPU, a memory capacity, or an average response time of an application.

FIG. 2 is a block diagram illustrating the internal schematic configuration of the work/recovery method management device 7 and the recovery method DB 6.

The work/recovery method management device 7 illustrated in FIG. 2 includes a management control unit 30 that manages and controls the work/recovery method management device 7 and the recovery method DB 6.

The management control unit 30 includes a working method information creating unit 31 and a before-and-after-work change information creating unit 32. The working method information creating unit 31 creates working method information indicating a working method for each work target that is executed by the work executing unit 13 of the operator terminal 3. The before-and-after-work change information creating unit 32 acquires before-work-start system information of the IT system 2 when detecting a work start command of the operator terminal 3 and acquires after-work-completion system information of the IT system 2 when detecting a work completion command of the operator terminal 3.

In this case, the work target corresponds to a target for a work such as "a state of server 1" or "a memory state of the server 1" as illustrated in FIG. 3.

The working method information corresponds to information that indicates a working method for a work target such as "the execution of shutdown command for the server 1" or "the memory exchange of the server 1" as illustrated in FIG. 3.

The working method information creating unit 31 creates working method information in accordance with a manual input or a work command input performed by the operator terminal 3, for example.

The before-and-after-work change information creating unit 32 acquires the before-work-start system information of the IT system 2 from the history management DB 8 or the IT system 2 when detecting the work start command of the operator terminal 3, and acquires the after-work-completion system information from the history management DB 8 or the IT system 2 when detecting the work completion command of the operator terminal 3.

Moreover, when acquiring the before-work-start system information and the after-work-completion system information, the before-and-after-work change information creating unit 32 creates before-and-after-work change information related to a change of the system before and after a work for each work target on the basis of difference information between the acquired before-work-start system information and after-work-completion system information.

In this case, as illustrated in FIG. 3, the before-and-after-work change information corresponds to a change of the system before and after a work for each work target such as "error→normal" assuming that the work target is "the memory state of the server 1" or "3000 msec→50 msec" assuming that the work target is "the average response time of an application 1".

Moreover, the recovery method DB 6 includes a work information managing and storing unit 41 that stores and manages for each work target the working method information created by the working method information creating unit 31 and the before-and-after-work change information created by the before-and-after-work change information creating unit 32.

Moreover, the management control unit 30 includes a recovery method information creating unit 33 that creates recovery method information indicating a recovery method for each similar recovery work target among the work targets on the basis of the working method information stored in the work information managing and storing unit 41.

In this case, the similar recovery work target corresponds to a work target such as "a state of a server" obtained by aggregating work targets, such as "a state of the server 1" and "a state of a server 2" stored in the work information managing and storing unit 41 as illustrated in FIG. 3.

The recovery method information corresponds to working method information such as "the execution of shutdown command" obtained by aggregating working method information, such as "the execution of the shutdown command on the server 1" and "the execution of the shutdown command on the server 2" stored in the work information managing and storing unit 41 as illustrated in FIG. 3.

Moreover, the management control unit 30 includes a before-and-after-recovery change information creating unit 34 that creates before-and-after-recovery change information related to a change of the system before and after a recovery work for each recovery work target on the basis of the before-and-after-work change information stored in the work information managing and storing unit 41.

Moreover, the recovery method DB 6 includes a recovery method managing and storing unit 42 that stores and manages the recovery method information created by the recovery method information creating unit 33 and the before-and-after-recovery change information created by the before-and-after-recovery change information creating unit 34 for each recovery work target as illustrated in FIG. 3.

Moreover, the management control unit 30 includes a failure information creating unit 35 that acquires before-failure-occurrence system information from the history management DB 8 and acquires after-failure-occurrence system information from the history management DB 8 or the IT system 2 when detecting a failure occurrence command.

The failure information creating unit 35 creates a failure target and before-and-after-failure change information related to a change of the system before and after a failure occurs on the basis of difference information between the acquired before-failure-occurrence system information and after-failure-occurrence system information.

In this case, the failure target corresponds to the target of a failure such as "a state of the server 1" or "a memory state of the server 1", which has a failure.

The before-and-after-failure change information corresponds to a change of the system before and after the occurrence of a failure for each failure target such as "normal→error" when the failure target is "the memory state of the server 1" or "50 msec→3000 msec" when the failure target is "the average response time of the application 1".

Moreover, the management control unit 30 includes a recovery method retrieving unit 36 that acquires, when the recovery method managing and storing unit 42 stores therein a recovery work target and before-and-after-recovery change information corresponding to the failure target and the before-and-after-failure change information created by the failure information creating unit 35, recovery method information corresponding to the before-and-after-recovery change information from the recovery method managing and storing unit 42, and informs the past recovery method management device 5 of the acquired recovery method information in order to present the recovery method information to the operator terminal 3.

The recovery method retrieving unit 36 determines whether a recovery work target corresponding to the failure target created by the failure information creating unit 35 is in the recovery method managing and storing unit 42.

When the recovery work target corresponding to the failure target is in the recovery method managing and storing unit 42, the recovery method retrieving unit 36 determines whether the before-and-after-recovery change information of the recovery work target corresponding to the before-and-after-failure change information of the failure target is in the recovery method managing and storing unit 42.

When the before-and-after-recovery change information of the recovery work target corresponding to the before-and-after-failure change information of the failure target is in the recovery method managing and storing unit 42, the recovery method retrieving unit 36 acquires the recovery method information corresponding to the before-and-after-recovery change information from the recovery method managing and storing unit 42.

In this case, the before-and-after-recovery change information corresponding to the before-and-after-failure change information corresponds to the before-and-after-recovery change information "error→normal" of a recovery work target "the memory state of the server" for returning the memory state from the after-failure-occurrence state "error" to the before-failure-occurrence state "normal", for example, when the before-and-after-failure change information of a failure target "the memory state of the server 1" is "normal→error". In this case, the recovery method information is "a part replacement of the memory" as illustrated in FIG. 3.

Next, it will be explained about the operations of the recovery method management system 1 according to the present embodiment. FIG. 5 is a flowchart illustrating the process operation of the recovery method management system 1 that is related to a recovery method management process.

The recovery method management process illustrated in FIG. 5 is a process for constantly updating the recovery method DB 6, which stores and manages a recovery method for an unknown failure, from works.

In FIG. 5, the management control unit 30 of the work/recovery method management device 7 determines whether a work start command of the operator terminal 3 is detected (Step S11).

When it is determined that the work start command is detected (Step S11: YES), the before-and-after-work change information creating unit 32 of the management control unit 30 acquires before-work-start system information of the IT system 2 from the history management DB 8 or the IT system 2 (Step S12).

The operator terminal 3 executes a work of the IT system 2 that corresponds to the work start command (Step S13).

Furthermore, the before-and-after-work change information creating unit 32 determines whether a work completion command of the operator terminal 3 is detected (Step S14).

When it is determined that the work completion command of the operator terminal 3 is detected (Step S14: YES), the before-and-after-work change information creating unit 32 acquires after-work-completion system information of the IT system 2 (Step S15).

The before-and-after-work change information creating unit 32 acquires difference information between the before-work-start system information and the after-work-completion system information (Step S16), and then creates before-and-after-work change information related to a change of the system before and after the work for each work target on the basis of the difference information (Step S17). In addition, the working method information creating unit 31 creates working method information that indicates a working method for each work target.

As illustrated in FIG. 3, the management control unit 30 stores the working method information created by the working method information creating unit 31 and the before-and-after-work change information created by the before-and-after-work change information creating unit 32 in the work information managing and storing unit 41 for each work target (Step S18).

The recovery method information creating unit 33 of the management control unit 30 creates recovery method information for each recovery work target that is obtained by aggregating similar work targets, on the basis of the working method information that is stored in the work information managing and storing unit 41 (Step S19). For example, as illustrated in FIG. 3, the recovery work target corresponds to "the state of the server" obtained by aggregating the work targets "the state of the server 1" and "the state of the server 2" and the recovery method information corresponds to "the execution of the shutdown command".

The before-and-after-recovery change information creating unit 34 of the management control unit 30 creates before-and-after-recovery change information for each recovery work target that is obtained by aggregating the similar work targets, on the basis of the before-and-after-work change information that is stored in the work information managing and storing unit 41 (Step S20).

As illustrated in FIG. 3, the management control unit 30 stores the recovery method information created by the recovery method information creating unit 33 and the before-and-after-recovery change information created by the before-and-after-recovery change information creating unit 34 in the recovery method managing and storing unit 42 for each recovery work target (Step S21), and terminates the process operation illustrated in FIG. 5.

When it is determined that the work start command is not detected at Step S11 (Step S11: NO), the management control unit 30 terminates the process operation illustrated in FIG. 5.

When it is determined that the work completion command is not detected at Step S14 (Step S14: NO), the management control unit 30 continues to perform the determination process of Step S14 in order to monitor whether the work completion command is detected.

In the recovery method management process illustrated in FIG. 5, the before-and-after-work change information based on the difference information between the before-work-start system information and the after-work-completion system information and the working method information indicating a working method are constantly stored in the work information managing and storing unit 41 for each work target. Therefore, an influence of each work that is given to the system can be preliminarily grasped.

Furthermore, in the recovery method management process, the before-and-after-recovery change information related to a system change before and after a recovery work and the recovery method information indicating a recovery method are stored in the recovery method managing and storing unit 42 for each similar recovery work target among the work targets on the basis of the working method information and the before-and-after-work change information stored in the work information managing and storing unit 41. Therefore, even if an unknown failure occurs, a recovery method (recovery method information) for the unknown failure can be selected on the basis of a recovery work target and before-and-after-recovery change information corresponding to the failure by using the memory content of the recovery method managing and storing unit 42.

Figure 6:
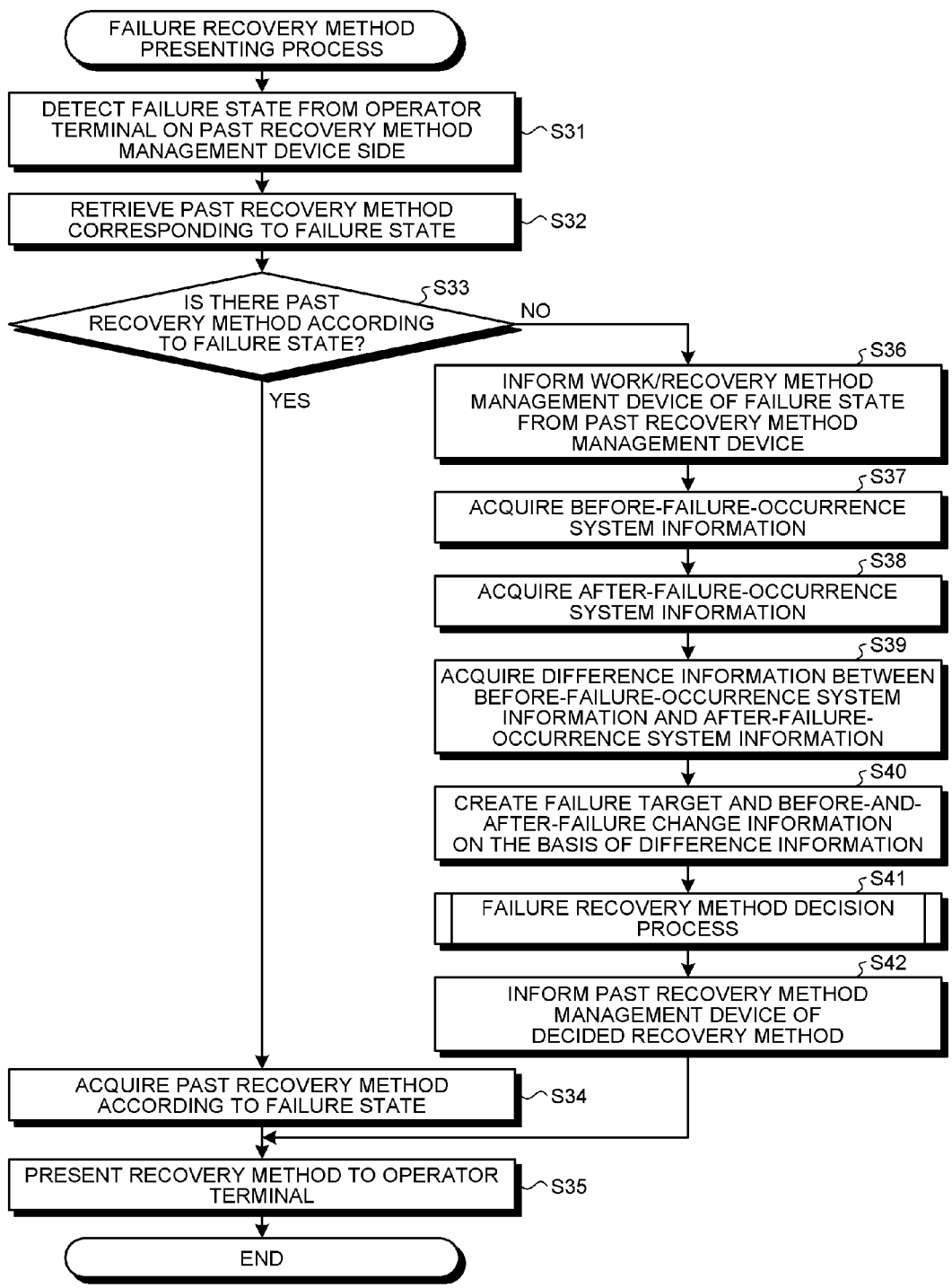
FIG. 6 is a flowchart illustrating the process operation of the recovery method management system that is related to a failure recovery method presenting process.

Next, it will be explained about a failure recovery method presenting process for presenting a recovery method for a failure to the operator terminal 3 at the time of the occurrence of the failure. FIG. 6 is a flowchart illustrating the process operation of the recovery method management system 1 that is related to the failure recovery method presenting process.

The failure recovery method presenting process illustrated in FIG. 6 is a process for presenting a recovery method for a failure to the operator terminal 3 at the time of the occurrence of the failure.

In FIG. 6, when a failure state corresponding to a failure is detected from the operator terminal 3 at the time of the occurrence of the failure (Step S31), the past recovery method retrieving unit 21 of the past recovery method management device 5 retrieves a past recovery method corresponding to the failure state from the past recovery method DB 4 (Step S32).

The past recovery method retrieving unit 21 determines whether the past recovery method corresponding to the failure state is in the past recovery method DB 4 (Step S33).

When the past recovery method corresponding to the failure state is in the past recovery method DB 4 (Step S33: YES), the past recovery method retrieving unit 21 acquires the past recovery method corresponding to the failure state from the past recovery method DB 4 (Step S34).

The recovery method presenting unit 22 presents the acquired recovery method corresponding to the failure state to the operator terminal 3 (Step S35), and terminates the process operation illustrated in FIG. 6.

When the past recovery method corresponding to the failure state is not in the past recovery method DB 4 (Step S33: NO), the past recovery method management device 5 informs the work/recovery method management device 7 of the failure state output from the operator terminal 3 (Step S36).

The failure information creating unit 35 of the management control unit 30 of the work/recovery method management device 7 acquires before-failure-occurrence system information from the history management DB 8 (Step S37).

The failure information creating unit 35 acquires after-failure-occurrence system information from the history management DB 8 or the IT system 2 (Step S38).

The failure information creating unit 35 acquires difference information between the before-failure-occurrence system information and the after-failure-occurrence system information (Step S39), and then creates a failure target and before-and-after-failure change information on the basis of the acquired difference information (Step S40).

When the failure target and the before-and-after-failure change information are created, the management control unit 30 executes a failure recovery method decision process (see FIG. 7) for deciding a recovery method for the failure on the basis of the failure target and the before-and-after-failure change information (Step S41), and then informs the past recovery method management device 5 of the decided recovery method (Step S42) and moves the process control to Step S35 in order to present the recovery method to the operator terminal 3.

In the failure recovery method presenting process illustrated in FIG. 6, when a failure occurs and a past recovery method corresponding to a failure state output from the operator terminal 3 is in the past recovery method DB 4, the past recovery method management device acquires the past recovery method corresponding to the failure state from the past recovery method DB 4 and presents the acquired past recovery method to the operator terminal 3 as a failure recovery method. Therefore, even if a failure occurs, the burden of the operator can be largely reduced because the operator can recognize a recovery method for the failure.

In the failure recovery method presenting process, when a failure occurs and a past recovery method corresponding to a failure state output from the operator terminal 3 is not in the past recovery method DB 4, the management control unit creates a failure target and before-and-after-failure change information on the basis of before-failure-occurrence system information and after-failure-occurrence system information in accordance with the failure state. When it is determined via the failure recovery method decision process (see FIG. 7) to be described below that a recovery work target and before-and-after-recovery change information corresponding to the failure target and the before-and-after-failure change information are in the recovery method managing and storing unit 42, the management control unit acquires recovery method information corresponding to the before-and-after-recovery change information from the recovery method managing and storing unit 42 and presents the acquired recovery method information to the operator terminal 3. Therefore, even if an unknown failure that has not occurred in past times occurs, the burden of the operator can be largely reduced because the operator can recognize a recovery method for the failure.

Figure 7:
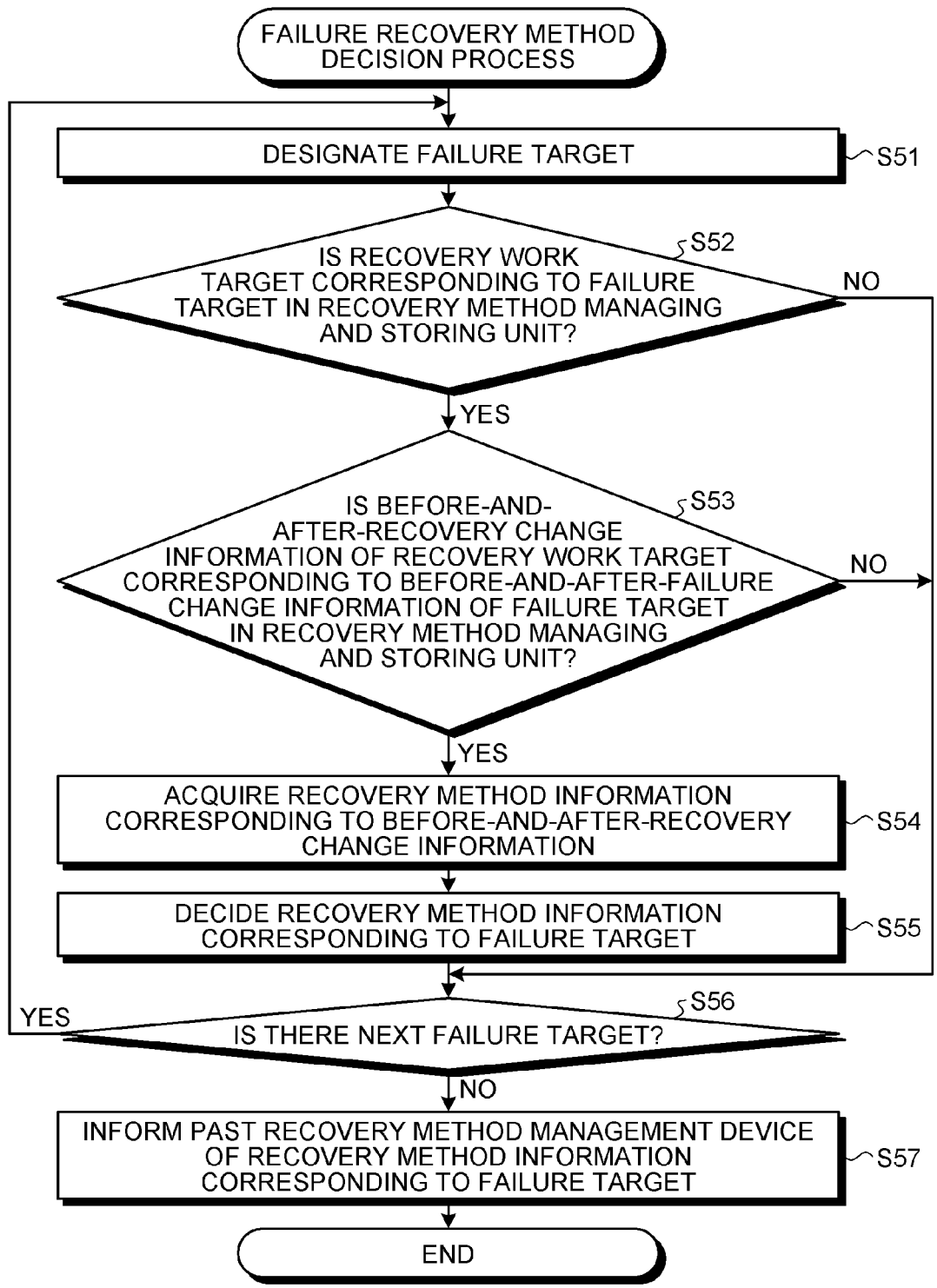
FIG. 7 is a flowchart illustrating the process operation of the work/recovery method management device that is related to a failure recovery method decision process.
Figure 8:
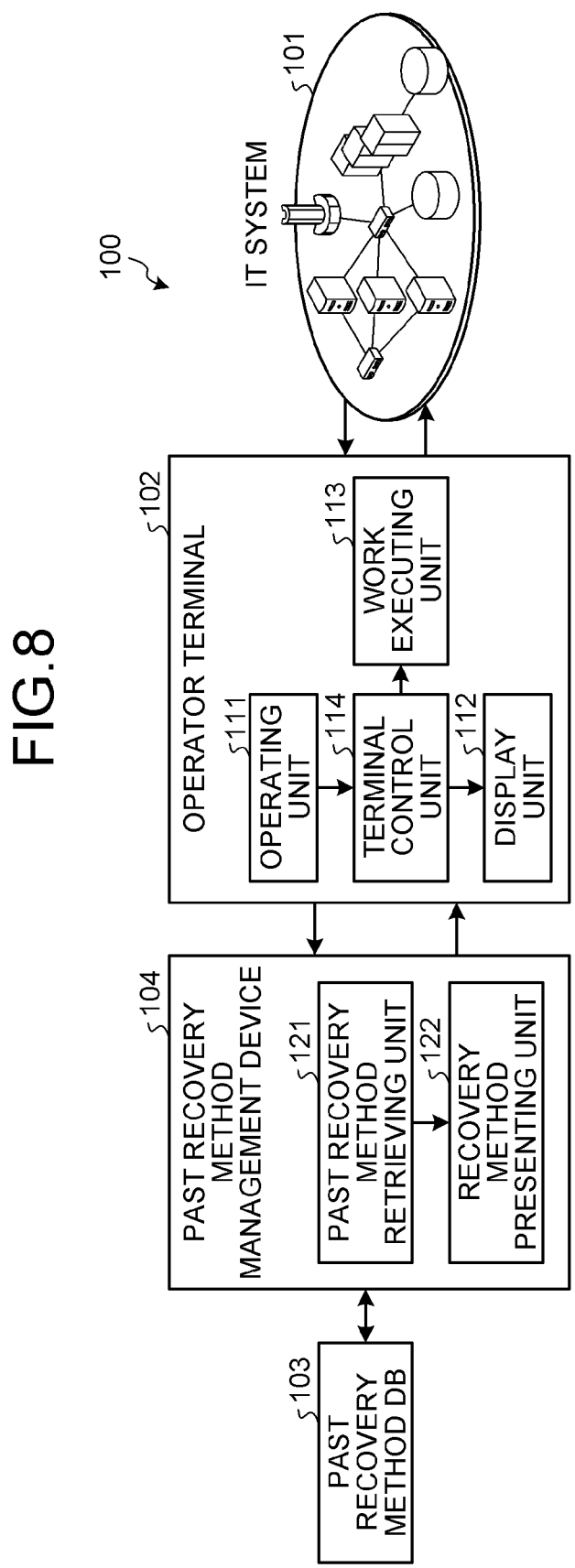
FIG. 8 is a block diagram illustrating the internal schematic configuration of a conventional recovery method management system.

Next, it will be explained about the failure recovery method decision process of Step S41 illustrated in FIG. 6. FIG. 7 is a flowchart illustrating the process operation of the work/recovery method management device 7 that is related to the failure recovery method decision process.

The failure recovery method decision process illustrated in FIG. 7 is a process for deciding a recovery method for an unknown failure when a recovery method for a failure state is not in the past recovery method DB 4.

The recovery method retrieving unit 36 of the management control unit 30 of the work/recovery method management device 7 designates one failure target among the failure targets created at Step S40 of FIG. 6 (Step S51). When the failure targets created at Step S40 are "the average response time of the application 1" and "the status of the CPU", a failure target is designated at Step S51.

The recovery method retrieving unit 36 determines whether the recovery work target corresponding to the failure target is in the recovery method managing and storing unit 42 (Step S52). For example, when the failure target is "the average response time of the application 1", the recovery method retrieving unit 36 determines whether the recovery work target "the average response time of an application" corresponding to "the average response time of the application 1" is in the recovery method managing and storing unit 42 as illustrated in FIG. 3.

When the recovery work target corresponding to the failure target is in the recovery method managing and storing unit 42 (Step S52: YES), the recovery method retrieving unit 36 determines whether the before-and-after-recovery change information of the recovery work target corresponding to the before-and-after-failure change information of the failure target is in the recovery method managing and storing unit 42 in order to return the failure target to a before-failure-occurrence state on the basis of the before-and-after-failure change information of the failure target (Step S53).

For example, when the before-and-after-failure change information of the failure target "the average response time of the application 1" is "50 msec→3000 msec" as illustrated in FIG. 4, the recovery method retrieving unit 36 determines whether the before-and-after-recovery change information "reduction" of the recovery work target corresponding to the before-and-after-failure change information "50 msec→3000 msec" of the failure target is in the recovery method managing and storing unit 42 in order to return the after-failure-occurrence state "3000 msec" to the before-failure-occurrence state "50 msec" as illustrated in FIG. 3.

When the before-and-after-recovery change information of the recovery work target corresponding to the before-and-after-failure change information of the failure target is in the recovery method managing and storing unit 42 (Step S53: YES), the recovery method retrieving unit 36 acquires the recovery method information corresponding to the before-and-after-recovery change information from the recovery method managing and storing unit 42 (Step S54).

When the before-and-after-recovery change information "reduction" of the recovery work target corresponding to the before-and-after-failure change information "50 msec→3000 msec" of the failure target is in the recovery method managing and storing unit 42, the recovery method retrieving unit 36 acquires recovery method information "increasing the value of parameter MaxThreads" corresponding to the before-and-after-recovery change information "reduction" of the recovery work target.

When acquiring the recovery method information corresponding to the before-and-after-recovery change information, the recovery method retrieving unit 36 decides the acquired recovery method information as a recovery method for the failure target (Step S55), and then determines whether there is the next failure target (Step S56).

When there is not the next failure target (Step S56: NO), the recovery method retrieving unit 36 informs the past recovery method management device 5 of the recovery method information corresponding to the failure target (Step S57) and terminates the process operation illustrated in FIG. 7.

When the recovery work target corresponding to the failure target is not in the recovery method managing and storing unit 42 (Step S52: NO) or when the before-and-after-recovery change information of the recovery work target corresponding to the before-and-after-failure change information of the failure target is not in the recovery method managing and storing unit 42 (Step S53: NO), the recovery method retrieving unit 36 moves the process control to Step S56 in order to determine whether there is the next failure target.

When there is the next failure target (Step S56: YES), the recovery method retrieving unit 36 moves the process control to Step S51 in order to designate the failure target.

When a plurality of failure targets is created at the time of the occurrence of a failure, recovery method information for each failure target is sequentially acquired. After that, the recovery method information for each failure target is presented to the operator terminal 3 via the past recovery method management device 5.

It has been explained about the case where the recovery method information for each failure target is sequentially acquired. However, recovery method information for a failure target is not limited to one. For example, in the case of the recovery method information of the work target "the status of the CPU", there may be more than one piece of the recovery method information, like "the exchange of CPU" and "the restart of a server".

In the failure recovery method decision process illustrated in FIG. 7, when a recovery work target and before-and-after-recovery change information corresponding to a failure target and before-and-after-failure change information are in the recovery method managing and storing unit 42, recovery method information corresponding to the recovery work target and the before-and-after-recovery change information is acquired from the recovery method managing and storing unit 42 and the acquired recovery method information is decided as a recovery method for the failure in order to return a failure state from an after-failure-occurrence state to a before-failure-occurrence state. Therefore, even if an unknown failure that has not occurred in past times occurs, a recovery method for the failure can be decided without the burden of the operator.

In the present embodiment, before-and-after-work change information based on difference information between before-work-start system information and after-work-completion system information and working method information indicating a working method are constantly stored in the work information managing and storing unit 41 for each work target. Therefore, an influence of each work that is given to the system can be preliminarily grasped.

Moreover, in the present embodiment, before-and-after-recovery change information related to a system change before and after a recovery work and recovery method information indicating a recovery method are stored in the recovery method managing and storing unit 42 for each similar recovery work target among the work targets on the basis of the working method information and the before-and-after-work change information stored in the work information managing and storing unit 41. Therefore, even if an unknown failure occurs, a recovery method (recovery method information) for the unknown failure can be selected on the basis of a recovery work target and before-and-after-recovery change information corresponding to the failure by using the memory content of the recovery method managing and storing unit 42.

Moreover, in the present embodiment, when a failure occurs and a past recovery method corresponding to a failure state output from the operator terminal 3 is in the past recovery method DB 4, the past recovery method corresponding to the failure state is acquired from the past recovery method DB 4 and the acquired past recovery method is presented to the operator terminal 3 as a failure recovery method. Therefore, even if a failure occurs, the burden of the operator can be largely reduced because the operator can recognize a recovery method for the failure.

Moreover, in the present embodiment, when a failure occurs and a past recovery method corresponding to a failure state output from the operator terminal 3 is not in the past recovery method DB 4, a failure target and before-and-after-failure change information are created on the basis of before-failure-occurrence system information and after-failure-occurrence system information in accordance with the failure state. When it is determined via the failure recovery method decision process (see FIG. 7) that a recovery work target and before-and-after-recovery change information corresponding to the failure target and the before-and-after-failure change information are in the recovery method managing and storing unit 42, recovery method information corresponding to the before-and-after-recovery change information is acquired from the recovery method managing and storing unit 42 and the acquired recovery method information is presented to the operator terminal 3. Therefore, even if an unknown failure that has not occurred in past times occurs, the burden of the operator can be largely reduced because the operator can recognize a recovery method for the failure.

Moreover, in the present embodiment, when a recovery work target and before-and-after-recovery change information corresponding to a failure target and before-and-after-failure change information are in the recovery method managing and storing unit 42, recovery method information corresponding to the recovery work target and the before-and-after-recovery change information is acquired from the recovery method managing and storing unit 42 and the acquired recovery method information is decided as a recovery method for the failure in order to return the failure state from an after-failure-occurrence state to a before-failure-occurrence state. Therefore, even if an unknown failure that has not occurred in past times occurs, a recovery method for the failure can be decided without the burden of the operator.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. Also, the effect of the present invention is not limited to the effect described in the present embodiment.

Moreover, among the processes described in the present embodiment, the whole or a part of processes that have been automatically performed can be manually performed. Alternatively, the whole or a part of processes that have been manually performed can be automatically performed in a well-known method. Also, processing procedures, control procedures, concrete titles, and information including various types of data and parameters, which are described in the document and the drawings, can be arbitrarily changed except that they are specially mentioned.

Moreover, each component of each device illustrated in the drawings is a functional concept. Therefore, these components are not necessarily constituted physically as illustrated in the drawings. In other words, the specific configuration of each device is not limited to the illustrated configuration.

Furthermore, all or an arbitrary part of various types of process functions performed by each device may be realized by a CPU (Central Processing Unit) (or microcomputers such as MPU (Micro Processing Unit) or MCU (Micro Controller Unit)) and a program that is analyzed and executed by the CPU (or microcomputers such as MPU or MCU), or may be realized by a hardware by wired logic.

According to an embodiment of the present invention, before-and-after-work change information based on difference information between before-work-start system information and after-work-completion system information and working method information indicating a working method are constantly stored in a work information managing and storing unit for each work target. Furthermore, before-and-after-recovery change information related to the change of a system before and after a recovery work and recovery method information indicating a recovery method are stored in a recovery method managing and storing unit for each similar recovery work target among the work targets on the basis of the working method information and the before-and-after-work change information stored in the work information managing and storing unit.

In other words, the working method information and the before-and-after-work change information are constantly stored in the work information managing and storing unit for each work target to preliminarily grasp an influence of each work that is given to a system, and further the recovery method information and the before-and-after-recovery change information are stored in the recovery method managing and storing unit for each recovery work target on the basis of the working method information and the before-and-after-work change information. Therefore, because a recovery method (recovery method information) for an unknown failure can be selected on the basis of a recovery work target and before-and-after-recovery change information corresponding to the failure by using the memory content of the recovery method managing and storing unit even if the unknown failure occurs, the burden of an operator can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing therein a recovery method management program, the recovery method management program causing a computer to execute a process, the process comprising:

executing a work on a work target of a system when detecting a work start command and completing the work on the work target when detecting a work completion command;

creating work information that indicates a working method for each work executed on the work target;

acquiring first system information which indicates system information before the work is started when detecting the work start command;

acquiring second system information which indicates system information after the work is completed when detecting the work completion command;

creating change information related to a change of the system before and after the work executed on each work target on the basis of a difference between the acquired first system information and second system information;

storing the created work information and the created change information in a first storing unit for each work target;

creating recovery information that indicates a recovery method for each recovery work target among the work targets on the basis of the work information stored in the first storing unit;

creating recovery change information related to a change of the system before and after a recovery work for each recovery work target on the basis of the change information stored in the first storing unit; and storing the created recovery information and the created recovery change information in a recovery storing unit for each recovery work target.

2. The computer-readable, non-transitory medium according to claim 1, wherein the process further comprises
sequentially storing the system information of the system in a history storing unit for each predetermined timing;
acquiring first failure information and second failure information from the history storing unit when detecting a failure occurrence command;
creating for each failure target, failure change information related to a change of the system before and after a failure occurs on the basis of a difference between the acquired first failure information and second failure information;
acquiring the recovery information corresponding to the recovery change information from the recovery storing unit; and
presenting the acquired recovery information when the recovery work target and the recovery change information corresponding to the failure target and the recovery change information are stored in the recovery storing unit.

3. The computer-readable, non-transitory medium according to claim 1, wherein the process further comprises
sequentially storing the system information of the system in a history storing unit for each predetermined timing;
acquiring first failure information from the history storing unit and acquiring second failure information from the system when detecting a failure occurrence command to create failure change information related to a change of the system before and after a failure occurs on the basis of a difference between the acquired first failure information and second failure information; and
acquiring the recovery information corresponding to the recovery change information from the recovery storing unit and presenting the acquired recovery information when the recovery work target and the recovery change information corresponding to the created failure change information are stored in the recovery storing unit.

4. A recovery method management device comprising:
a work executing unit that executes a work on a work target of a system when detecting a work start command and completes the work on the work target when detecting a work completion command;
a work information creating unit that creates work information indicating a working method for each work executed on the work target;
a change information creating unit that creates change information related to a change of the system before and after the work executed on each work target on the basis of a difference between first system information acquired when detecting the work start command and second system information acquired when detecting the work completion command;
a first storing unit that stores the work information and the created change information for each work target;
a recovery information creating unit that creates recovery information indicating a recovery method for each recovery work target among the work targets on the basis of the work information stored in the first storing unit;
a recovery change information creating unit that creates recovery change information related to a change of the system before and after a recovery work for each recovery work target on the basis of the change information stored in the first storing unit; and
a recovery storing unit that stores created recovery information and the created recovery change information for each recovery work target.

5. The recovery method management device according to claim 4, further comprising:
a history storing unit that sequentially stores the system information of the system for each predetermined timing;
a failure information creating unit that acquires first failure information and second failure information from the history storing unit when detecting a failure occurrence command and creates failure change information related to a change of the system before and after a failure occurs on the basis of a difference between the acquired first failure information and second failure information for each failure target; and
a recovery method presenting unit that acquires the recovery information corresponding to the recovery change information from the recovery storing unit and presents the acquired recovery information when the recovery work target and the recovery change information corresponding to the failure target and the recovery change information are stored in the recovery storing unit.

6. The recovery method management device according to claim 4, further comprising:
a history storing unit that sequentially stores the system information of the system for each predetermined timing;
a failure information creating unit that acquires first failure information from the history storing unit and acquires second failure information from the system when detecting a failure occurrence command to create failure change information related to a change of the system before and after a failure occurs on the basis of a difference between the acquired first failure information and second failure information; and
a recovery method presenting unit that acquires the recovery information corresponding to the recovery change information from the recovery storing unit and presents the acquired recovery information when the recovery work target and the recovery change information corresponding to the failure change information created by the failure information creating unit are stored in the recovery storing unit.

7. A recovery method management method comprising:
executing a work on a work target of a system when detecting a work start command and completing the work on the work target when detecting a work completion command;
creating work information that indicates a working method for each work executed on the work target;
acquiring first system information which indicates system information before the work is started when detecting the work start command;
acquiring second system information which indicates system information after the work is completed when detecting the work completion command;
creating change information related to a change of the system before and after the work executed on each work target on the basis of a difference between the acquired first system information and second system information;
storing the created work information and the created change information in a first storing unit for each work target;

creating recovery information that indicates a recovery method for each recovery work target among the work targets on the basis of the work information stored in the first storing unit;
creating recovery change information related to a change of the system before and after a recovery work for each recovery work target on the basis of the change information stored in the first storing unit; and
storing the created recovery information and the created recovery change information in a recovery storing unit for each recovery work target.

8. The recovery method management method according to claim 7, further comprising
sequentially storing the system information of the system in a history storing unit for each predetermined timing;
acquiring first failure information and second failure information from the history storing unit when detecting a failure occurrence command;
creating for each failure target, failure change information related to a change of the system before and after a failure occurs on the basis of a difference between the acquired first failure information and second failure information;
acquiring the recovery information corresponding to the recovery change information from the recovery storing unit; and
presenting the acquired recovery information when the recovery work target and the recovery change information corresponding to the failure target and the recovery change information are stored in the recovery storing unit.

9. The recovery method management method according to claim 7, further comprising:
sequentially storing the system information of the system in a history storing unit for each predetermined timing;
acquiring first failure information from the history storing unit and acquiring second failure information from the system when detecting a failure occurrence command to create failure change information related to a change of the system before and after a failure occurs on the basis of a difference between the acquired first failure information and second failure information; and
acquiring the recovery information corresponding to the recovery change information from the recovery storing unit and presenting the acquired recovery information when the recovery work target and the recovery change information corresponding to the created failure change information are stored in the recovery storing unit.

* * * * *